No. 614,310.  
P. RUPP.  
BELT PULLEY.  
(Application filed Mar. 29, 1898.)

Patented Nov. 15, 1898.

(No Model.)

WITNESSES  
INVENTOR  
Peter Rupp  
by Herbert W. T. Jenner  
Attorney

THE NORRIS PETERS CO., PHOTO-LITHO., WASHINGTON, D. C.

UNITED STATES PATENT OFFICE.

PETER RUPP, OF WHITE HOUSE, OHIO.

BELT-PULLEY.

SPECIFICATION forming part of Letters Patent No. 614,310, dated November 15, 1898.

Application filed March 29, 1898. Serial No. 675,583. (No model.)

*To all whom it may concern:*

Be it known that I, PETER RUPP, a citizen of the United States, residing at White House, in the county of Lucas and State of Ohio, have invented certain new and useful Improvements in Belt-Pulleys; and I do hereby declare the following to be a full, clear, and exact description of the invention, such as will enable others skilled in the art to which it appertains to make and use the same.

This invention relates to belt-pulleys; and it consists in the novel construction and combination of the parts hereinafter fully described and claimed.

Figure 1:
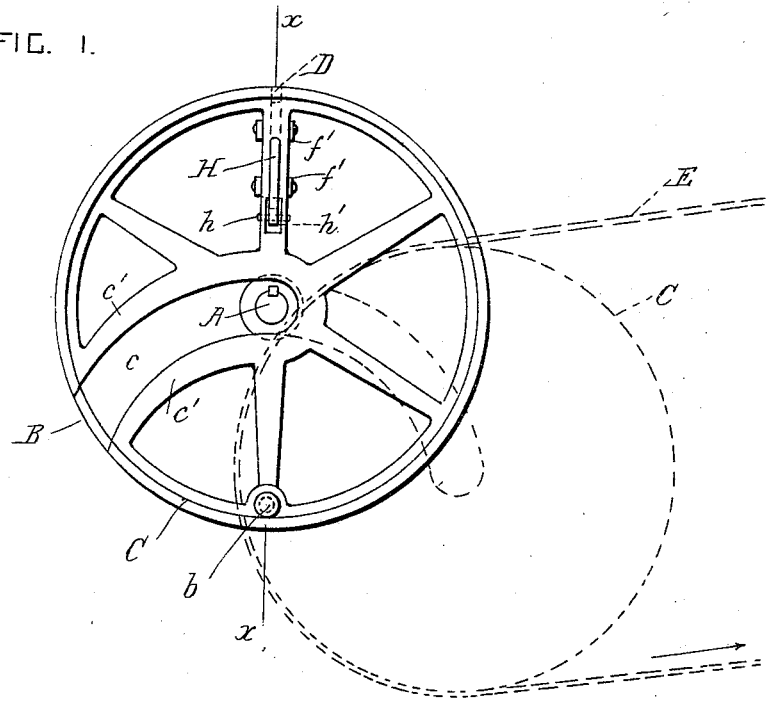
Figure 2:
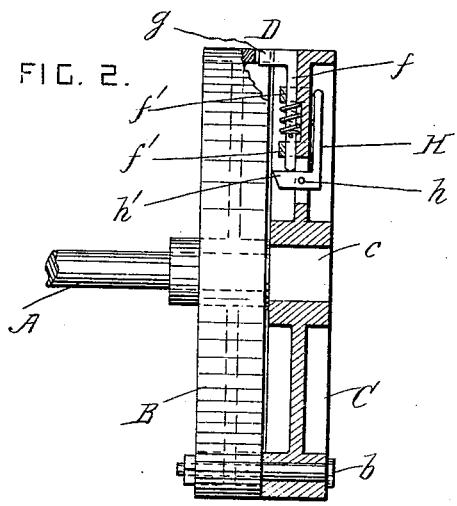

In the drawings, Figure 1 is a side view of the pulley. Fig. 2 is a section taken on the line $x\,x$ in Fig. 1.

A is a shaft, and B is the main pulley or the main part of the pulley, which is mounted on the shaft A and is of any approved construction. In order to facilitate the placing of a belt on the pulley, the pulley is made in two parts.

C is the auxiliary pulley or part of the pulley, which is of the same diameter as the main part B. The auxiliary pulley or part C is pivoted to the main pulley or part B by a pin $b$, arranged on one side of the shaft A, and is coupled to the main part on the other side of the said shaft by a disengageable fastening device D of any approved construction.

The auxiliary part C of the pulley is not connected to or attached to the shaft A in any way. When a belt is to be placed on the pulley, the fastening device D is disengaged and the auxiliary part is turned on its pivot to the position shown by dotted lines in Fig. 1 or to any other position in which the belt can most easily be slipped onto it. The belt E is indicated in dotted lines. When the parts are in the position shown by the dotted lines and the belt is driven in the direction of the arrow, the tension of the belt tends to move the auxiliary part across the main part of the pulley. The auxiliary part can be moved by hand, if desired, until it assumes the position shown in full lines in Fig. 1, or the tension of the belt can be assisted by hand. When the auxiliary part is in the position shown in full lines, it is secured to the main part by the fastening device D, and both parts then revolve concentric with the shaft.

The auxiliary part C is made with an aperture $c$, which will enable it to clear the shaft as it is moved across the main part. The aperture $c$ is of any convenient form, and when it extends through the rim of the part C curved arms $c'$ are formed one on each side of it. These arms are concentric of the pivot and support the rim on each side of the aperture.

The fastening device D consists of a retractible spring-pressed bolt $f$, which slides in guides $f'$ on the part C. The bolt $f$ is provided with a projection $g$, which engages with a notch in the part B and locks the two parts of the pulley together. When the two parts are brought together in putting on the belt, the projection $g$ is moved outward by contact with the periphery of the part B until it drops into the notch and locks the two parts together automatically. The bolt $f$ is pushed outward by hand to permit the two parts to be separated.

H is a lever pivoted to the part C by a pin $h$ and provided with a projection $h'$, which comes under the end of the bolt $f$. The bolt is moved outward by turning the lever away from the part C.

When a belt-pulley is constructed in this manner, the belt can be slipped onto it with great ease and facility.

I do not confine myself to the pulley described and shown, as it only exemplifies one form of my invention.

What I claim is—

1. A belt-pulley comprising two parts pivoted together on one side of their center, one part being slidable across the other so as to be eccentric of it, and means for locking the said parts when concentric with each other, substantially as set forth.

2. A belt-pulley comprising two parts, one of the said parts being slidable across the other so as to be eccentric of it, and means for locking the said parts when concentric with each other, substantially as set forth.

3. A belt-pulley comprising two parts pivoted together on one side of their center, and a bolt for securing together the said two parts when concentric with each other, one part being slidable across the other when said bolt is retracted, substantially as set forth.

4. The combination, with a shaft, and a main belt-pulley mounted on it; of an auxiliary belt-pulley slidable across the main pulley so as to be eccentric of it, and means for locking the said pulleys when concentric, substantially as set forth.

5. The combination, with a shaft, and a main pulley mounted on it; of an auxiliary pulley pivoted to the main pulley on one side of the shaft and provided with an aperture or gap permitting it to be slid clear of the shaft, and means for locking the said pulleys when concentric, substantially as set forth.

6. The combination, with a main pulley, of a slidable auxiliary pulley pivoted to the main pulley on one side of its center, and a spring-pressed bolt carried by one pulley and locking the two pulleys automatically when placed concentric with each other, substantially as set forth.

7. The combination, with a main pulley, of a slidable auxiliary pulley pivoted to the main pulley on one side of its center, a spring-pressed bolt carried by one pulley and engaging with the other pulley when said pulleys are concentric, and a lever pivoted to the pulley which carries the said bolt and affording a means for retracting it, substantially as set forth.

8. The combination, with a shaft, and a main pulley mounted on it; of an auxiliary pulley pivoted to the main pulley on one side of the shaft and provided with an aperture or gap and curved arms one on each side of said aperture which support the rim and permit it to be slid clear of the shaft, and means for locking the auxiliary pulley when concentric with the main pulley, substantially as set forth.

In testimony whereof I affix my signature in presence of two witnesses.

PETER RUPP.

Witnesses:
 J. W. EBER,
 F. A. BUTLER.